United States Patent
Balmakhtar et al.

(10) Patent No.: US 12,225,088 B2
(45) Date of Patent: Feb. 11, 2025

(54) EDGE COMPUTING NETWORK TOPOLOGY HIDING

(71) Applicant: T-Mobile Innovations LLC, Overland Park, KS (US)

(72) Inventors: Marouane Balmakhtar, Fairfax, VA (US); Galip Murat Karabulut, Vienna, VA (US); Laurent A. Laporte, Spring Hills, KS (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/404,871

(22) Filed: Jan. 4, 2024

(65) Prior Publication Data

US 2024/0146813 A1    May 2, 2024

Related U.S. Application Data

(62) Division of application No. 18/163,880, filed on Feb. 3, 2023, which is a division of application No. 17/508,739, filed on Oct. 22, 2021, now Pat. No. 11,611,622.

(51) Int. Cl.
*H04L 67/141*    (2022.01)
*H04L 67/10*    (2022.01)

(52) U.S. Cl.
CPC ............ *H04L 67/141* (2013.01); *H04L 67/10* (2013.01)

(58) Field of Classification Search
CPC ............................... H04L 67/141; H04L 67/10
See application file for complete search history.

(56) References Cited

U.S. PATENT DOCUMENTS

| 11,611,622 B1 | 3/2023 | Balmakhtar et al. |
| 11,909,827 B2 | 2/2024 | Balmakhtar et al. |
| 2014/0148162 A1 | 5/2014 | Maharaj |

(Continued)

FOREIGN PATENT DOCUMENTS

CN    105850091 A  *  8/2016  ......... H04L 63/0209

OTHER PUBLICATIONS

Restriction Requirement dated Sep. 16, 2022 U.S. Appl. No. 17/508,739, filed Oct. 22, 2021.

(Continued)

*Primary Examiner* — Hua Fan

(57) ABSTRACT

A method of establishing an application layer connection between a user equipment (UE) and an application executing on an edge computing node via a communication network. The method comprises receiving an application service availability message by the UE that identifies a plurality of networks that provide access to an identified application executing on an edge computing node within the network; for each network identified in the application service availability message, receiving by the UE an application service figure-of-merit determined by that network associated with a prospective application layer connection between the UE and an edge computing node executing the identified application that is located in that network; based on evaluating the figure-of-merit associated with each network establishing an application layer connection by the UE via the selected network to the application executing on the edge computing node in the selected network.

20 Claims, 12 Drawing Sheets

(56) References Cited

U.S. PATENT DOCUMENTS

| | | | |
|---|---|---|---|
| 2014/0341085 A1* | 11/2014 | Suryavanshi | H04L 65/1063 |
| | | | 370/260 |
| 2019/0082352 A1* | 3/2019 | Hua | H04W 76/15 |
| 2021/0006992 A1 | 1/2021 | Keaton et al. | |
| 2022/0141761 A1* | 5/2022 | Cai | H04W 48/14 |
| | | | 709/222 |
| 2023/0188610 A1 | 6/2023 | Balmakhtar et al. | |

OTHER PUBLICATIONS

Notice of Allowance dated Nov. 30, 2022 U.S. Appl. No. 17/508,739, filed Oct. 22, 2021.
Restriction Requirement dated Aug. 24, 2023 U.S. Appl. No. 18/163,880, filed Feb. 3, 2023.
Notice of Allowance dated Dec. 19, 2023 U.S. Appl. No. 18/163,880, filed Feb. 3, 2023.

\* cited by examiner

EDGE COMPUTING NETWORK TOPOLOGY HIDING

CROSS-REFERENCE TO RELATED APPLICATIONS

This application is a divisional of and claims priority under 35 U.S.C. § 120 to U.S. patent application Ser. No. 18/163,880, filed on Feb. 3, 2023, entitled "Edge Computing Network Topology Hiding," by Marouane Balmakhtar, et al., which is a divisional of and claims priority under 35 U.S.C. § 120 to U.S. patent application Ser. No. 17/508,739, filed on Oct. 22, 2021, entitled "Edge Computing Network Topology Hiding," by Marouane Balmakhtar, et al., now U.S. Pat. No. 11,611,622 issued on Mar. 21, 2023, all of which are incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication coverage is nearly ubiquitous in the United States. Subscribers to wireless communication services can place voice calls and establish data connections while stationary or mobile. Data connections are persisted across handoffs of user equipments (UEs) (e.g., smart phones, laptop computers, wearable computers, etc.) from one access point to a second access point. To improve user experience with applications on UEs, wireless communication service providers are deploying edge computing resources. The idea of edge computing is to connect application clients executing on UEs to physically proximate computers executing application servers via the network. By keeping these communication paths in the thin outer skin of the communication network, data throughput, latency, and jitter key performance indicators (KPIs) can be improved and user experiences enhanced. Additionally, by keeping these communication paths in the thin outer skin of the communication network, the network traffic deeper within the service provider's network can be reduced.

SUMMARY

In an embodiment, a method of establishing an application layer connection between a user equipment (UE) and an application executing on an edge computing node via a communication network is disclosed. The method comprises sending an application service request message by the UE to a home network to which the UE is subscribed, wherein the application service request message identifies an application and a current location of the UE and receiving an application service availability message by the UE that identifies a plurality of networks, where each of the identified networks provides access to the identified application executing on an edge computing node within the network. The method further comprises, for each network identified in the application service availability message, establishing an application layer connection by the UE with the application executing on the edge computing node in that network and, for each network identified in the application service availability message, evaluating by UE the application layer connection provided by that network. The method further comprises, based on evaluating the application layer connections, selecting by the UE one network for connecting to the application and establishing an application layer connection by the UE via the selected network to the application executing on the edge computing node in the selected network.

In another embodiment, a method of establishing an application layer connection between a user equipment (UE) and an application executing on an edge computing node via a communication network is disclosed. The method comprises sending an application service request message by the UE to a home network to which the UE is subscribed, wherein the application service request message identifies an application and a current location of the UE and receiving an application service availability message by the UE that identifies a plurality of networks, where each of the identified networks provides access to the identified application executing on an edge computing node within the network. The method further comprises, for each network identified in the application service availability message, receiving by the UE an application service figure-of-merit determined by that network based on a network latency value, a network jitter value, a network throughput value associated with a prospective application layer connection between the UE and an edge computing node executing the identified application that is located in that network and, based on evaluating the figure-of-merit associated with each network identified in the application service availability message, selecting by the UE one network for connecting to the application. The method further comprises establishing an application layer connection by the UE via the selected network to the application executing on the edge computing node in the selected network.

In yet another embodiment, a method of establishing an application layer connection between a user equipment (UE) and an application executing on an edge computing node via a communication network is disclosed. The method comprises receiving an application service request message from the UE by a computer located in a home network to which the UE is subscribed, wherein the application service request message identifies an application and a current location of the UE and sending the application service request message by the computer in the home network to a plurality of other networks. The method further comprises receiving an application service availability message from at least one of the other networks that identifies an edge computing node in that network that executes the identified application, wherein the identity of the edge computing node is an obfuscated identity. The method further comprises sending an aggregated application service availability message by the computer in the home network to the UE, wherein the aggregated application service availability message comprises the obfuscated identity of the at least one of the other networks, whereby the UE is enabled to request an application layer connection to an edge computing node using an obfuscated identity and whereby the other networks are able to maintain the details of their edge computing topology confidential.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
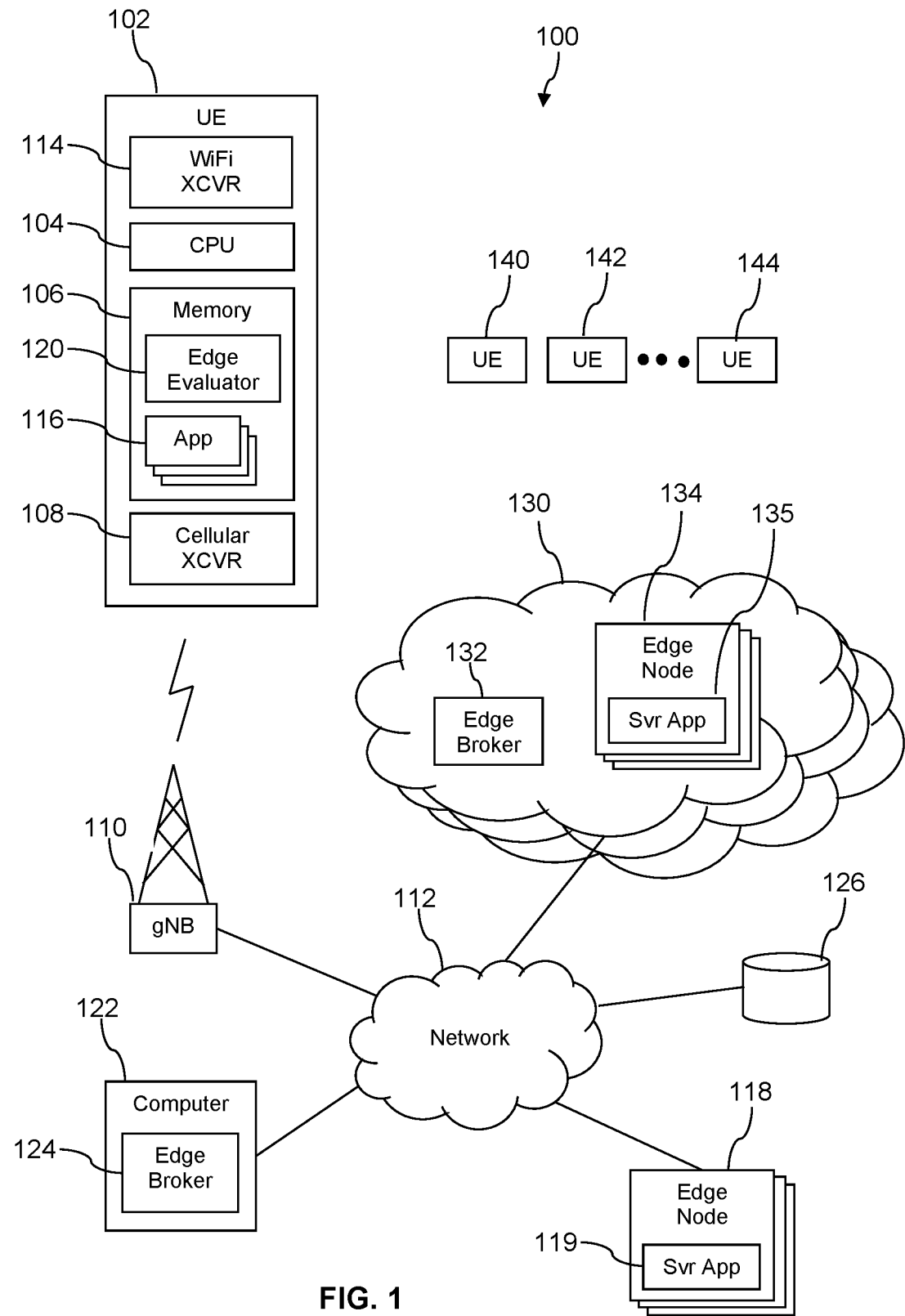
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In the 5G network edge computing becomes important because it is a way of conserving and/or more efficiently using network resources. One of the aspirational goals of 5G network technology is to provide unlimited bandwidth to users on demand. That is a tough promise to deliver on, and edge computing helps to support this by reducing network backbone traffic. A complication is introduced when inter-carrier cooperation in providing access to edge computing services is considered. The preferred edge compute node (e.g., the closest) for a subscriber of a first wireless communication carrier or service provider in a given case may be provided by a second wireless carrier rather than the first wireless carrier the subscriber is affiliated with. But how does the UE of the subscriber make this evaluation if it doesn't know where all the edge computing nodes of all the wireless carriers are located? Other wireless carriers, however, do not want to expose the physical locations of their edge computing resources. Competing wireless carriers desirably may want to keep the topology of their edge computing network hidden.

The present disclosure teaches a system and method for supporting inter-carrier edge computing access to UEs while reducing, limiting, and/or varying the exposure of information to help keep the topology of each carrier's edge computing modes confidential. The identity and/or communication address of an edge computing node is provided as an obfuscated identity, for example as a hashed value or as an encrypted value. The hashing or the encryption of the obfuscated identities of edge computing nodes may be changed periodically or on an event driven basis, whereby to avoid the making of inferences about the location of edge computing nodes and using the obfuscated identities as proxies for actual identities or addresses of edge computing nodes. The carrier may re-encrypt the obfuscated identities with different salts periodically. The carrier may re-hash the obfuscated identities with different salts periodically. If the obfuscated identity is a hash, the subject wireless communication carrier may maintain a data store that maps hashed obfuscated identities to an actual location and/or address of the edge computing nodes.

In an embodiment, an edge evaluator application executing on a UE may request a list of carriers that support an edge computing node proximate a current location of the UE from its home carrier (e.g., the carrier with which the user of the UE has a wireless communication subscription account). This request can designate an application whose service the UE wishes to connect to, for example a gaming application, a premium video connection to support medical procedures, or a banking application. The home carrier determines what carriers support this application on proximate edge computing nodes, for example by sending queries to these foreign carriers. As used herein, the term 'foreign carrier' does not mean a carrier active in a foreign country but rather a carrier active in the same country but different from the carrier who the subject UE is subscribed to for wireless communication service. Foreign carriers that can support the identified application in an edge computing node proximate the location of the UE may reply to the home carrier, providing an obfuscated identity of its edge computing node. The home carrier may then send a response that includes obfuscated identities of the edge computing nodes in one or more foreign carriers to the UE. If the home carrier itself supports this application on a proximate edge computing node, the obfuscated identity of its own edge computing node may be included along with those provided by the foreign carriers.

The edge evaluator may then evaluate the available edge computing nodes and select one of them based on its evaluation. Having chosen one of the edge computing nodes, the edge evaluator sends an application layer connection request to the home carrier including the obfuscated identity of the selected edge computing node. The application layer connection request may additionally comprise an identity of the carrier that supports the selected edge computing node. Alternatively, the home network may keep a record of what foreign carrier is associated with each obfuscated identity and use this record to map the obfuscated identity received from the edge evaluator to request the application layer connection from the appropriate foreign carrier. The foreign carrier can then set up the application layer connection from the selected edge computing node to the home carrier and to the UE.

The edge evaluator may evaluate each of the available edge computing nodes through a series of temporary trials whereby the UE establishes an application layer connection with each available edge computing node, captures key performance indicators (KPIs) of this connection, and choose the edge computing node associated with the best KPIs. Alternatively, the foreign carriers and optionally the home carrier may determine a figure-of-merit for its available edge computing node and provide this figure-of-merit along with the obfuscated identity back to the UE. The edge evaluator may then select the edge computing node with which to establish an application layer connection based on comparing among the figures-of-merit of each of the available edge computing nodes. The figure-of-merit can be an objective measure of the quality of the application layer connection the subject edge computing node can provide. This figure-of-merit may be calculated based on a uniform algorithm imposed on each of the foreign carriers and the home carrier. A third party may monitor and audit faithful adherence to the uniform algorithm whereby to police fair competition. The figure-of-merit may be determined based in part on a number of communication hops (router-to-router-to-router) between the UE and the edge computing node. The figure-of-merit may be determined based in part on an estimated or projected latency of the application layer connection. The figure-of-merit may be determined based in part on an estimated or projected jitter of the application layer connection. The figure-of-merit may be determined based in part on an estimated or projected data throughput of the application layer connection. The figure-of-merit may be determined based in part on a processing capacity of the edge computing node. The figure-of-merit may be determined based in part on a network load in the path from the UE to the edge computing node.

The use of obfuscated identities and evaluation of alternative available edge computing nodes can enable the rapid deployment of edge computing technology by wireless communication carriers and thereby make wireless communications more efficient and at the same time improving communications experienced by end users. The disclosure teaches a particular technical solution, as described concisely above and in more detail hereinafter, to the technical problem of delivering bandwidth on demand through edge computing.

Turning now to FIG. 1, a system 100 is described. In an embodiment, the system 100 comprises a user equipment (UE) 102 comprising a processor 104, a memory 106, and a cellular radio transceiver 108. The UE 102 may be a smart phone, a personal digital assistant (PDA), a wearable computer, a headset computer, a laptop computer, a notebook computer, a tablet computer, or an embedded computer. An embedded computer may comprise a processor, a memory, and a wireless communication interface that is embedded within a system of some kind. The embedded computer may be embedded within a home appliance such as a refrigerator, in a clothes washer, in a clothes dryer, in a security system, in an entertainment system, in a residential HVAC system, in a smart home system. The embedded computer may be embedded within a vehicle such as an automobile, a pickup truck, a light truck, a semi-truck, a tractor, or a construction vehicle. The cellular radio transceiver 108 is able to establish a wireless communication link with a cell site 110 according to a 5G, a long-term evolution (LTE), a code division multiple access (CDMA), or a global system for mobile communication (GSM) telecommunication protocol. The cell site 110 may communicatively couple the UE 102 to a network 112. The network 112 comprises one or more public networks, one or more private networks, or a combination thereof.

An application 116 or application client may be stored in a non-transitory portion of the memory 106 and be executed by the processor 104. The application 116 may establish an application layer connection to an edge computing node where a server application associated with the application 116 executes. For example, the application layer connection may be made between the application 116 and a server application 119 executing on an edge computing node 118 located in a network operated by a wireless communication service provider (e.g., a wireless communication carrier or more simply a carrier) that provides a wireless communication service subscription to the UE 102. The network operated by the wireless communication service provider that the UE 102 is subscribed to may be referred to as a 'home network' and networks operated by other wireless communication service providers may be referred to as 'foreign networks.' Alternatively, the application layer connection may be made between the application 116 and a server application 135 executing on an edge computing node 134 located in a foreign network. In an embodiment, to support the goals of edge computing, it may be desirable that the application layer connection be established between the application 116 and the physically closest edge computing node 118, 134, regardless of whether located in the home network or in foreign networks.

In an embodiment, an edge evaluator application 120 stored in a non-transitory portion of the memory 106 and executed by the processor 104 learns what edge computing nodes 118, 134 execute the desired server application 119, 135 and evaluates which one of these edge computing nodes 118, 134 is most eligible to connect the application 116 to. This evaluation may be made solely based on physical proximity of the UE 102 to the edge computing nodes 118, 134. Alternatively, the evaluation may be made not just based on physical proximity but further based on network key performance indicators (KPIs) associated with each candidate application layer connection—either currently measured KPI or projected KPI.

The edge evaluator 120 may collaborate with an edge broker 124 executing on a computer system 122 in the home network associated with the UE 102. The application 116 may request an application layer connection to an associated server application that executes on an edge computing node 118, 134. The edge evaluator 120 handles this request. The edge evaluator 120 may send an application service request to the edge broker 124, where the application service request identifies the application 116 and provides an indication of the location of the UE 102. The application 116 may be a gaming application or client. The application 116 may be a premium video communication service application or client, for example a high definition medical video service that can support remote surgery or remote consultation by a skilled surgeon or medical specialist.

The edge broker 124 may relay the application service request to one or more edge brokers 132 in foreign networks 130 to see if edge computing nodes 134 in those foreign networks 130 may be available for supporting the application 116. In an embodiment, the edge broker 124 may modify the content of the application service request before sending it to the edge brokers 132 in the foreign networks 130. The edge brokers 132 may provide a reply to the edge broker 124 identifying one or more edge computing nodes 134 that can support the application 116.

In an embodiment, the identity of the edge computing nodes 134 may be provided as an obfuscated identity. The obfuscated identity can be used within the foreign network 130 to identify the appropriate edge computing node 134, but the obfuscated identity is meaningless or useless outside of the foreign network 130. Foreign networks 130 may provide obfuscated identities of edge computing nodes 134 in order to prevent the home network, or other network, from inferring their network topology. In an embodiment, the obfuscated identity may be an encrypted value, such that the edge broker 132 or other communication node in a network can decrypt the obfuscated identity to obtain the true identity of an edge computing node 118, 134. The encrypted value of the obfuscated identity may be redetermined periodically or on an event, for example by using a different salt to determine the encrypted value, whereby to prevent the obfuscated identity becoming a sort of proxy identity. Alternatively, the obfuscated identity may be determined as a hash value, and a mapping from the hash value to the true identity of the edge computing node 118, 134 may be stored in a data base in the network, for example in the data store 126. When the edge broker 124, 132 or other node in the network receives a request for service directed to an obfuscated identity, the hash value can be mapped to the true identity of the edge computing node 118, 134, and the desired application layer connection can be established between the application 116 and the server application executing on the edge computing node 118, 134.

It is noted that the edge broker 124 may send a reply to the edge evaluator 120 that identifies edge computing nodes 118 in the home network of the UE 102 and that identifies edge computing nodes 134 in foreign networks 130. Also, the edge broker 124 may respond to application service requests from foreign networks 130 and provide one or more obfuscated identities associated with its edge computing nodes 118 to the edge broker 132 of that foreign network 130. The system 100 may support any number of UEs, including 100, second UE 140, third UE 142, and fourth UE 144. UEs 140, 142, 144 are not represented in FIG. 1 as attached to any particular cell site, because they may be attached to a cell site associated with any network.

In an embodiment, the UE 102 may attach to the network 112 via a WiFi radio transceiver 114 of the UE 102 to a WiFi access point (not shown) that is communicatively coupled to the network 112.

Figure 2:
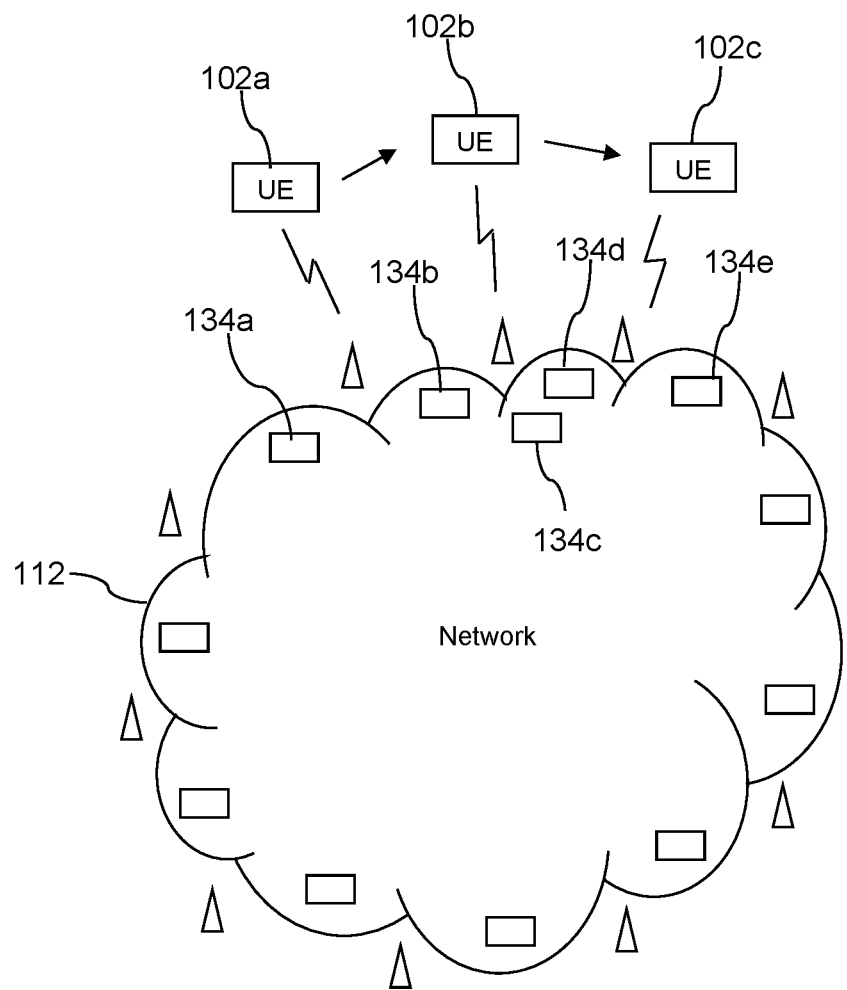
FIG. 2 is a block diagram of a communication system according to an embodiment of the disclosure.

Turning now to FIG. 2, a different view of the communication system 100 is described. While in FIG. 1 the network 112 illustrated the home network, in FIG. 2 the network 112 is meant to illustrate the collectivity of networks 112, 130 of FIG. 1 without differentiating between a home network and foreign networks. The term 'edge computing' is well understood by those skilled in the art. Basically, it means that computing platforms are physically proximate to users, whereby to minimize the physical distance that communications between users and computing platforms. In turn, the hoped-for result of edge computing is to reduce communication latency and reduce long-haul traffic over a core network. As shown in FIG. 2, a UE 102 may be located at position 102a at a first time, move to a position 102b at a second time, and move to a position 102c at a third time. As the UE 102 moves, it may wirelessly attach to different cell sites. As the UE 102 moves, it may be closest to different edge computing nodes 134 at different times. For example, at the first time the UE 102a may be equally close to a first edge computing node 134a and a second edge computing node 134b. At a second time the UE 102b may be about equally close to the second edge computing node 134b, a third edge computing node 134c, and a fourth edge computing node 134d. At a third time, the UE 102c may be about equally closer to a fifth edge computing node 134e. The edge evaluator application 120 may re-evaluate what edge computing node 134 to establish an application layer connection to on the event of handing over from one cell site to a different cell site. The edge evaluator application 120 may re-evaluate what edge computing node 134 to establish an application layer connection to periodically, for example every 5 seconds, every 15 seconds, once per minute, or on some other periodic basis. Additionally, the edge evaluator application 120 may re-evaluate on wireless communication events, such as on the event of a handoff from a first cell site 110 to a different cell site or on the event of a transition from attaching to a first cell site 110 associated with a first mobile communication service provider (e.g., a first carrier) to a different cell site associated with a second mobile communication service provider (e.g., a different carrier).

Figure 3:
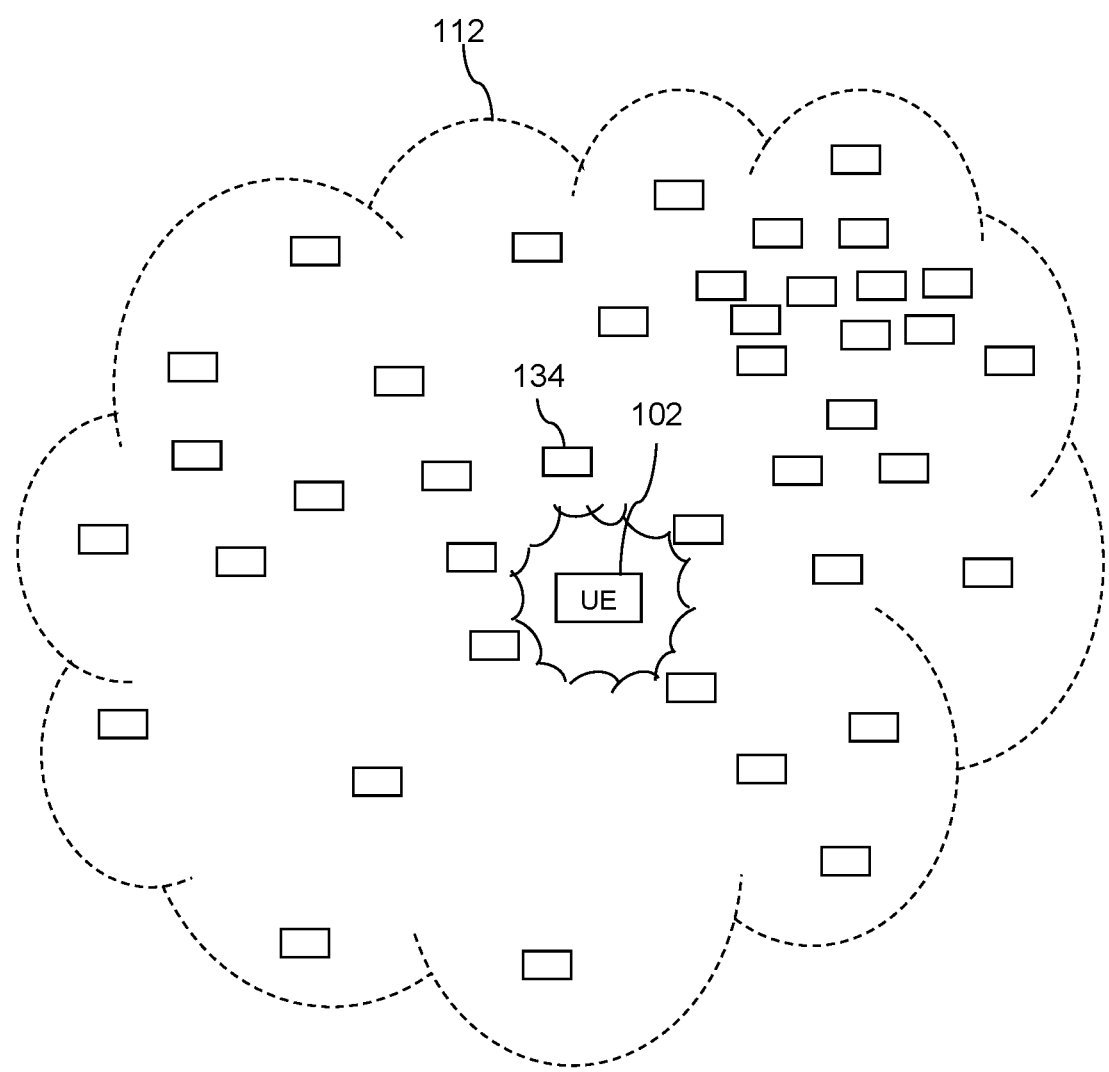
FIG. 3 is a block diagram of a communication system according to an embodiment of the disclosure.

Turning now to FIG. 3, a different illustration of edge computing is described. While in FIG. 1 the network 112 illustrated the home network, in FIG. 3 the network 112 is meant to illustrate the collectivity of networks 112, 130 of FIG. 1 without differentiating between a home network and foreign networks. It can be supposed that the UE 102 is disposed in a field of edge computing nodes spread out across the whole United States. Rather than the UE 102 being apparently outside of the network, instead the UE is illustrated in FIG. 3 as being surrounded by the network, and the edge of the network surrounds the UE 102. It is observed that this is just another attempt to illustrate the concept of edge computing in a different way and is consistent with the other depictions in FIG. 1 and FIG. 2. FIG. 3 illustrates that the distribution of edge computing nodes 134 may not be uniform across the extent of the network 112. For example, edge computing nodes 134 are illustrated as more densely clustered in the upper right of the network 112 in FIG. 3, which may correspond to a densely populated city. By contrast, edge computing nodes are illustrated as sparsely clustered in the lower left of FIG. 3, which may correspond to a rural area.

Figure 4:
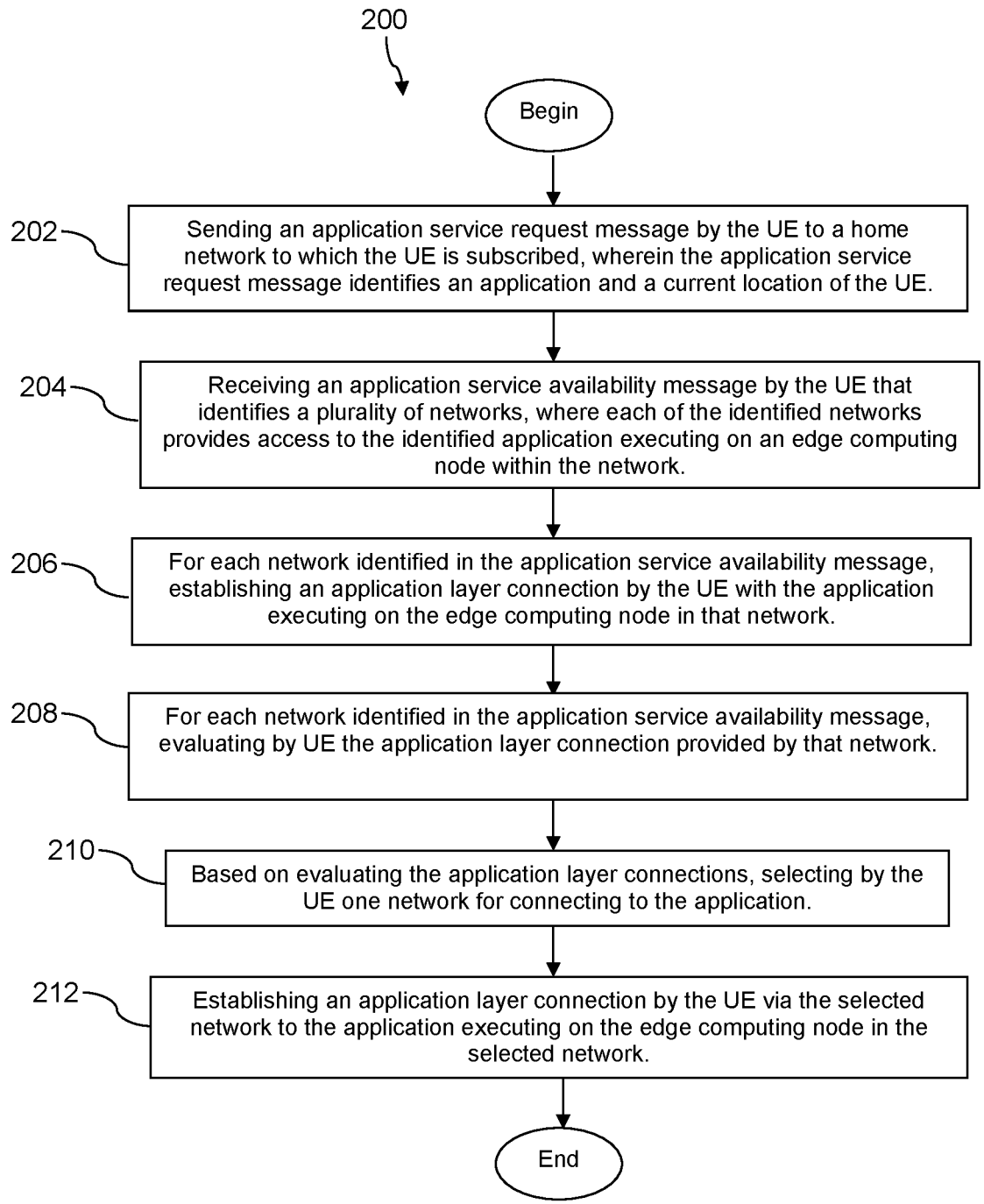
FIG. 4 is a flow chart of a method according to an embodiment of the disclosure.

Turning now to FIG. 4, a method 200 is described. In an embodiment, the method 200 is a method of establishing an application layer connection between a user equipment (UE) and an application executing on an edge computing node via a communication network. In an embodiment, at least some of the processing of method 200 is performed by the edge evaluator application 120 described above. In an embodiment, the UE is one of a smart phone, a personal digital assistant (PDA), a wearable computer, a headset computer, a laptop computer, a notebook computer, a tablet computer, or an embedded computer. At block 202, the method 200 comprises sending an application service request message by the UE to a home network to which the UE is subscribed, wherein the application service request message identifies an application and a current location of the UE. In an embodiment, the application is a gaming application or a medical video application. At block 204, the method 200 comprises receiving an application service availability message by the UE that identifies a plurality of networks, where each of the identified networks provides access to the identified application executing on an edge computing node within the network.

At block 206, the method 200 comprises, for each network identified in the application service availability message, establishing an application layer connection by the UE with the application executing on the edge computing node in that network. At block 208, the method 200 comprises for each network identified in the application service availability message, evaluating by UE the application layer connection provided by that network. In an embodiment, the UE evaluates each of the networks identified in the application service availability message by determining network key performance indicators (KPIs) associated with the application layer connection between the UE and that network. In an embodiment, the KPIs comprise one or more of a data throughput, a jitter, or a latency of the application layer connection. In an embodiment, the UE evaluated the application layer connection based in part on a number of communication nodes (e.g., a number of "hops") between the UE and the edge computing node executing the identified application that is located in that network.

At block 210, the method 200 comprises, based on evaluating the application layer connections, selecting by the UE one network for connecting to the application. At block 212, the method 200 comprises establishing an application layer connection by the UE via the selected network to the application executing on the edge computing node in the selected network.

Figure 5:
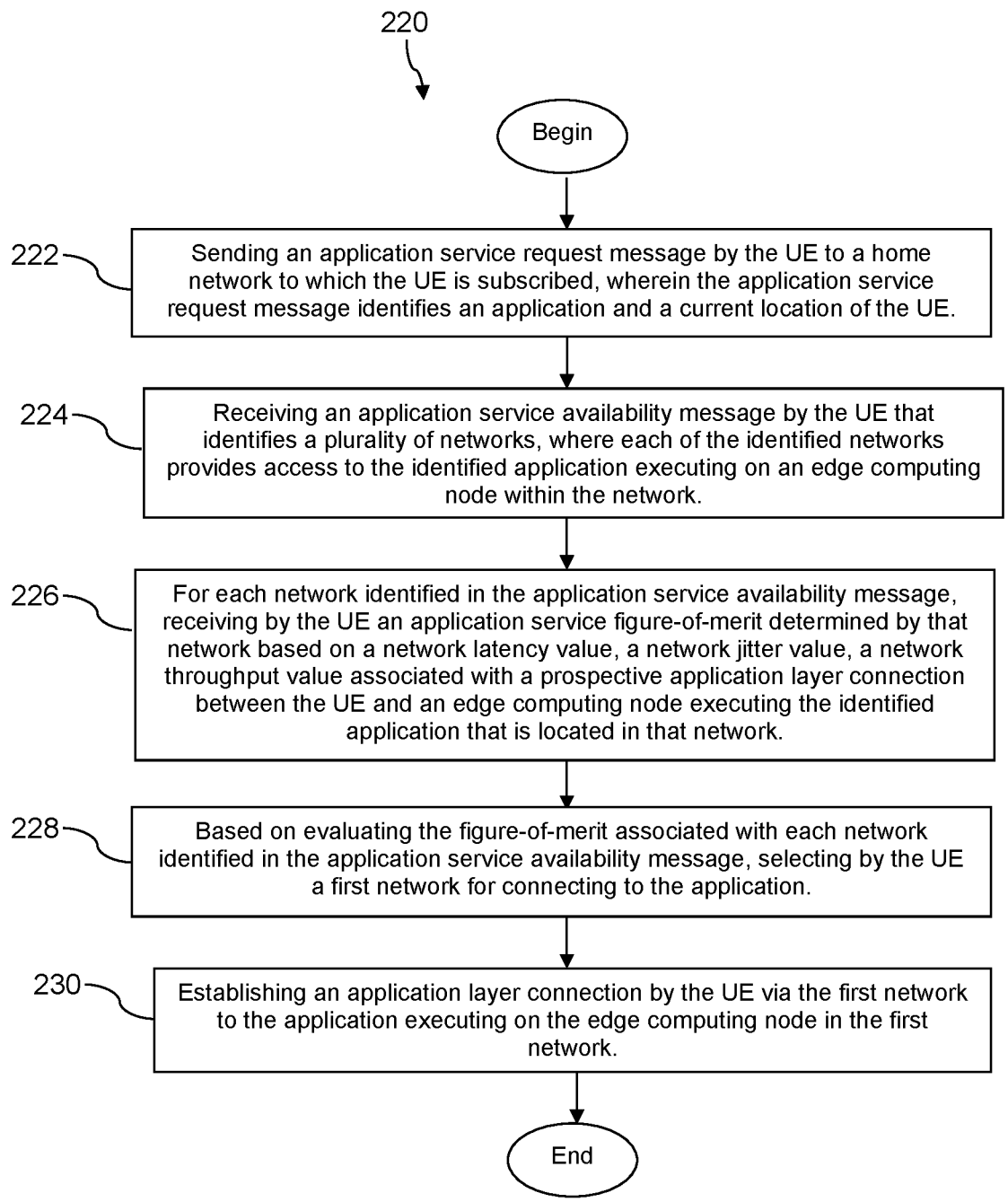
FIG. 5 is a flow chart of another method according to an embodiment of the disclosure.

Turning now to FIG. 5, a method 220 is described. In an embodiment, the method 220 is a method of establishing an application layer connection between a user equipment (UE) and an application executing on an edge computing node via a communication network. In an embodiment, at least some of the processing of method 220 is performed by the edge evaluator application 120 described above. In an embodiment, the UE is one of a smart phone, a personal digital assistant (PDA), a wearable computer, a headset computer, a laptop computer, a notebook computer, a tablet computer, or an embedded computer. At block 222, the method 220 comprises sending an application service request message by the UE to a home network to which the UE is subscribed, wherein the application service request message identifies an application and a current location of the UE. In an embodiment, the application is a gaming application or a medical video application. At block 224, the method 220 comprises receiving an application service availability message by the UE that identifies a plurality of networks, where each of the identified networks provides access to the identified application executing on an edge computing node within the network.

At block 226, the method 220 comprises, for each network identified in the application service availability message, receiving by the UE an application service figure-of-merit determined by that network based on a network latency value, a network jitter value, a network throughput value associated with a prospective application layer connection between the UE and an edge computing node executing the identified application that is located in that network. In an embodiment, the application service figure-of-merit is determined based in part on a number of communication nodes (e.g., a number of "hops") between the UE and the edge computing node executing the identified application that is located in that network. At block 228, the method 220 comprises, based on evaluating the figure-of-merit associated with each network identified in the application service availability message, selecting by the UE a first network for connecting to the application.

At block 230, the method 220 comprises establishing an application layer connection by the UE via the first network to the application executing on the edge computing node in the first network.

In an embodiment, the processing of method 220 further comprises detecting when the UE has attached to a different cell site and, when the UE has attached to a different cell site, repeating the processing of blocks 222 through block 230, whereby a different application connection with a different edge computing node in the same network or in a different network may be established. In an embodiment, the processing of method 220 further comprises detecting when a predefined period of time has passed since the UE established the application layer connection to the first network and, after that predefined period of time has passed, repeating the processing of blocks 222 through block 230, whereby a different application connection with a different edge computing node in the same network or in a different network may be established. In these ways—either on the event of UE handoff or passage of time—the edge evaluator application 120 of the UE 102 may keep the application 116 connected to the appropriate edge computing node 118, 134.

Figure 6:
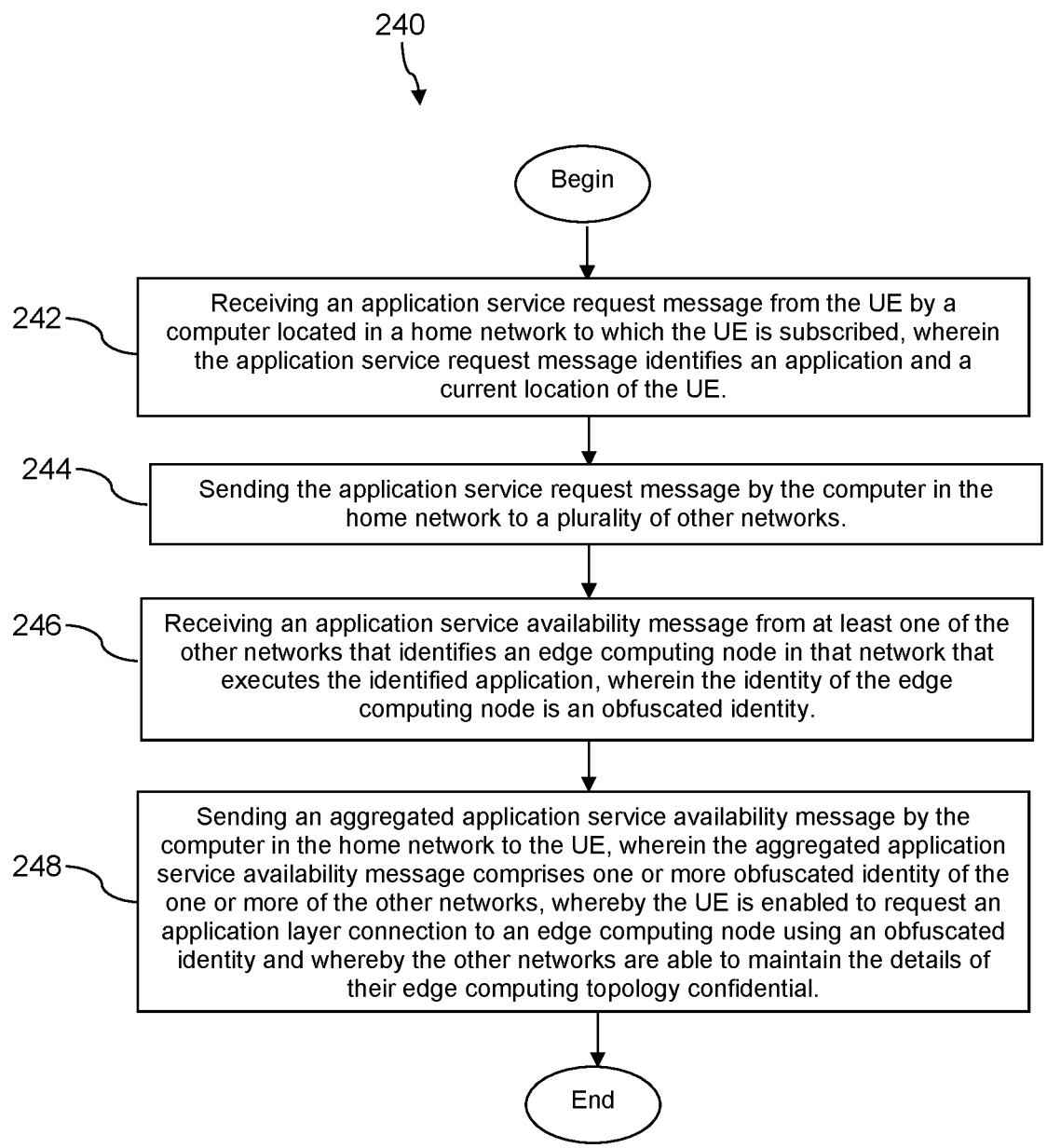
FIG. 6 is a flow chart of yet another method according to an embodiment of the disclosure.

Turning now to FIG. 6, a method 240 is described. In an embodiment, the method 240 is a method of establishing an application layer connection between a user equipment (UE) and an application executing on an edge computing node via a communication network. In an embodiment, the UE is one of a smart phone, a personal digital assistant (PDA), a wearable computer, a headset computer, a laptop computer, a notebook computer, a tablet computer, or an embedded computer. At block 242, the method 240 comprises receiving an application service request message from the UE by a computer located in a home network to which the UE is subscribed, wherein the application service request message identifies an application and a current location of the UE. In an embodiment, the UE is communicatively coupled to the home network, at least in part, via a cellular wireless communication link. In an embodiment, the UE is communicatively coupled to the home network, at least in part, via a WiFi wireless communication link.

At block 244, the method 240 comprises sending the application service request message by the computer in the home network to a plurality of other networks. At block 246, the method 240 comprises receiving an application service availability message from at least one of the other networks that identifies an edge computing node in that network that executes the identified application, wherein the identity of the edge computing node is an obfuscated identity. In an embodiment, the obfuscated identity is an encrypted identity of the edge computing node. In an embodiment, the obfuscated identity is a hashed identity of the edge computing node. In an embodiment, the obfuscated identity of the edge computing node is changed periodically, whereby the obfuscated identity is prevented from becoming a proxy identity of the edge computing node.

At block 248, the method 240 comprises sending an aggregated application service availability message by the computer in the home network to the UE, wherein the aggregated application service availability message comprises one or more obfuscated identity of the one or more of the other networks, whereby the UE is enabled to request an application layer connection to an edge computing node using an obfuscated identity and whereby the other networks are able to maintain the details of their edge computing topology confidential.

Figure 7:
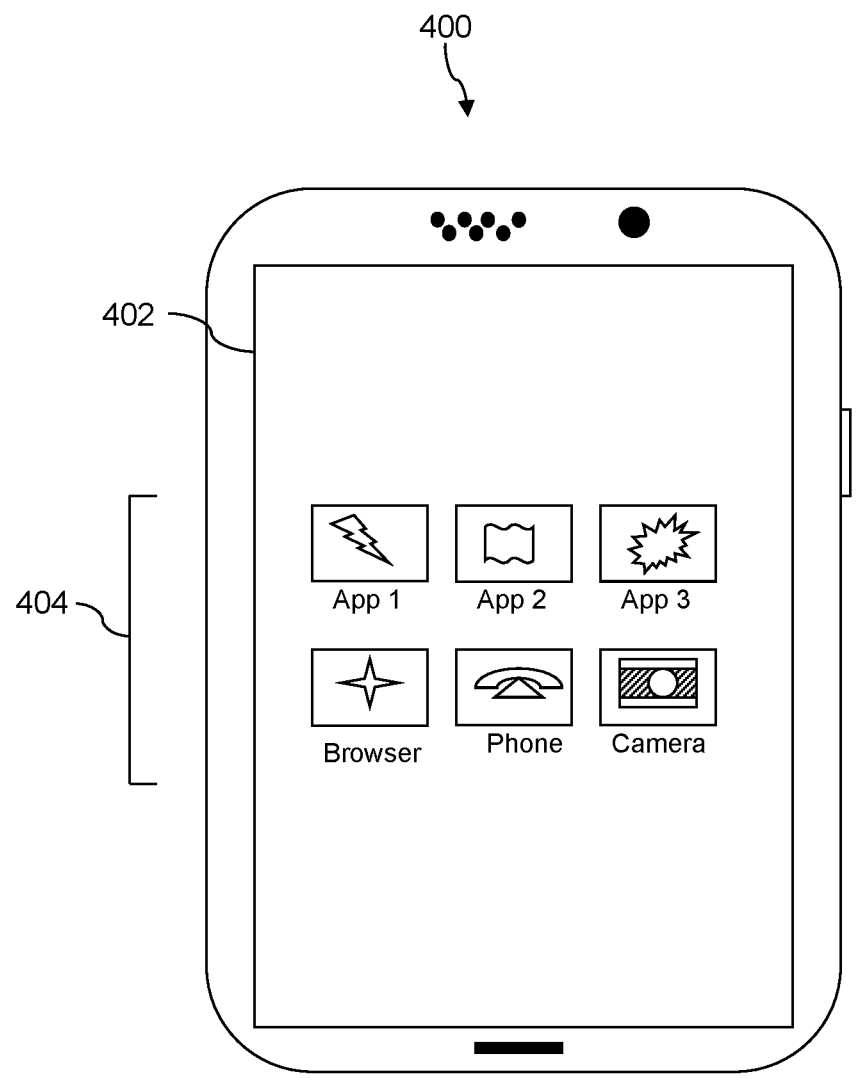
FIG. 7 is an illustration of a user equipment (UE) according to an embodiment of the disclosure.

FIG. 7 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 8:
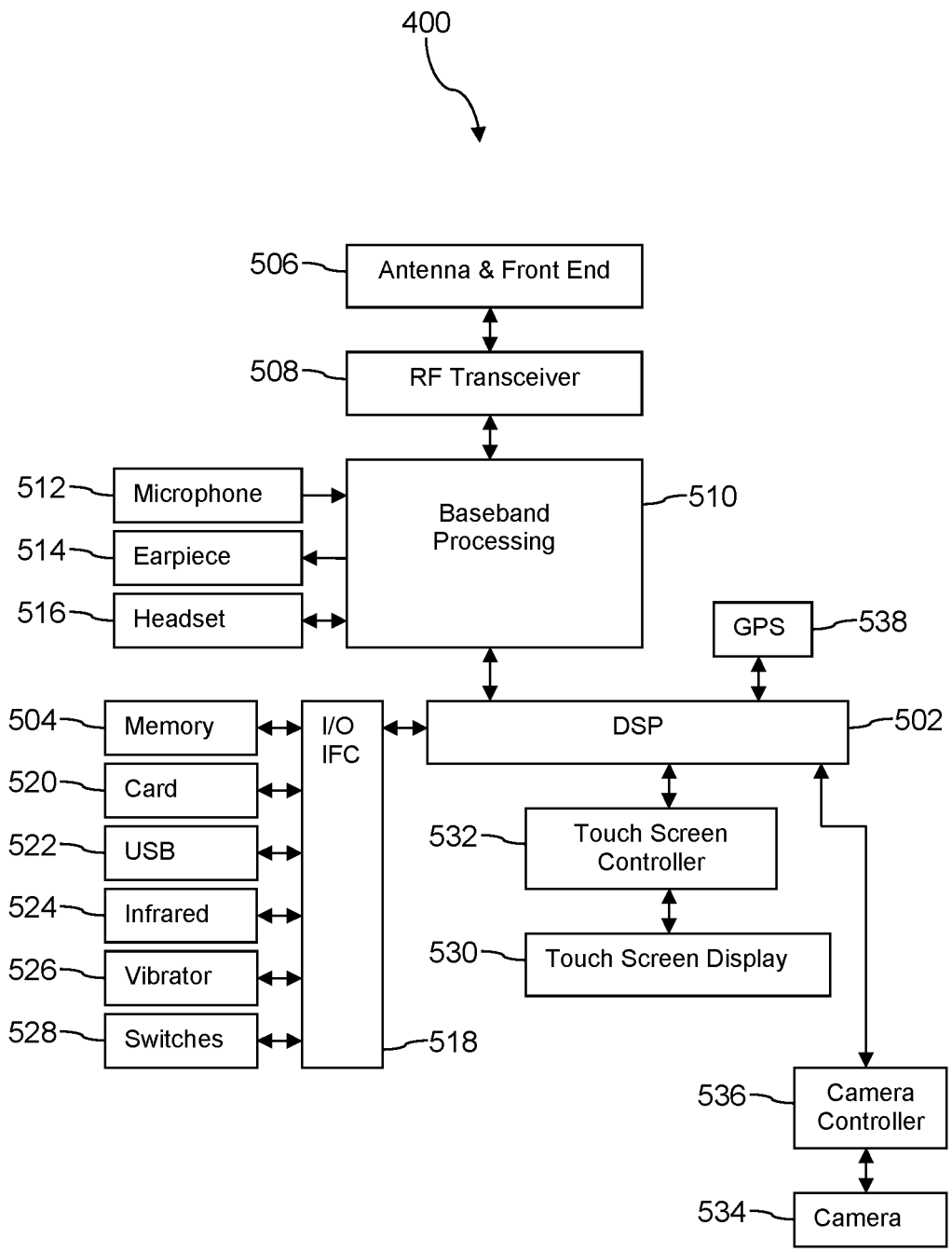
FIG. 8 is a block diagram of a hardware architecture of a UE according to an embodiment of the disclosure.

FIG. 8 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 9A:
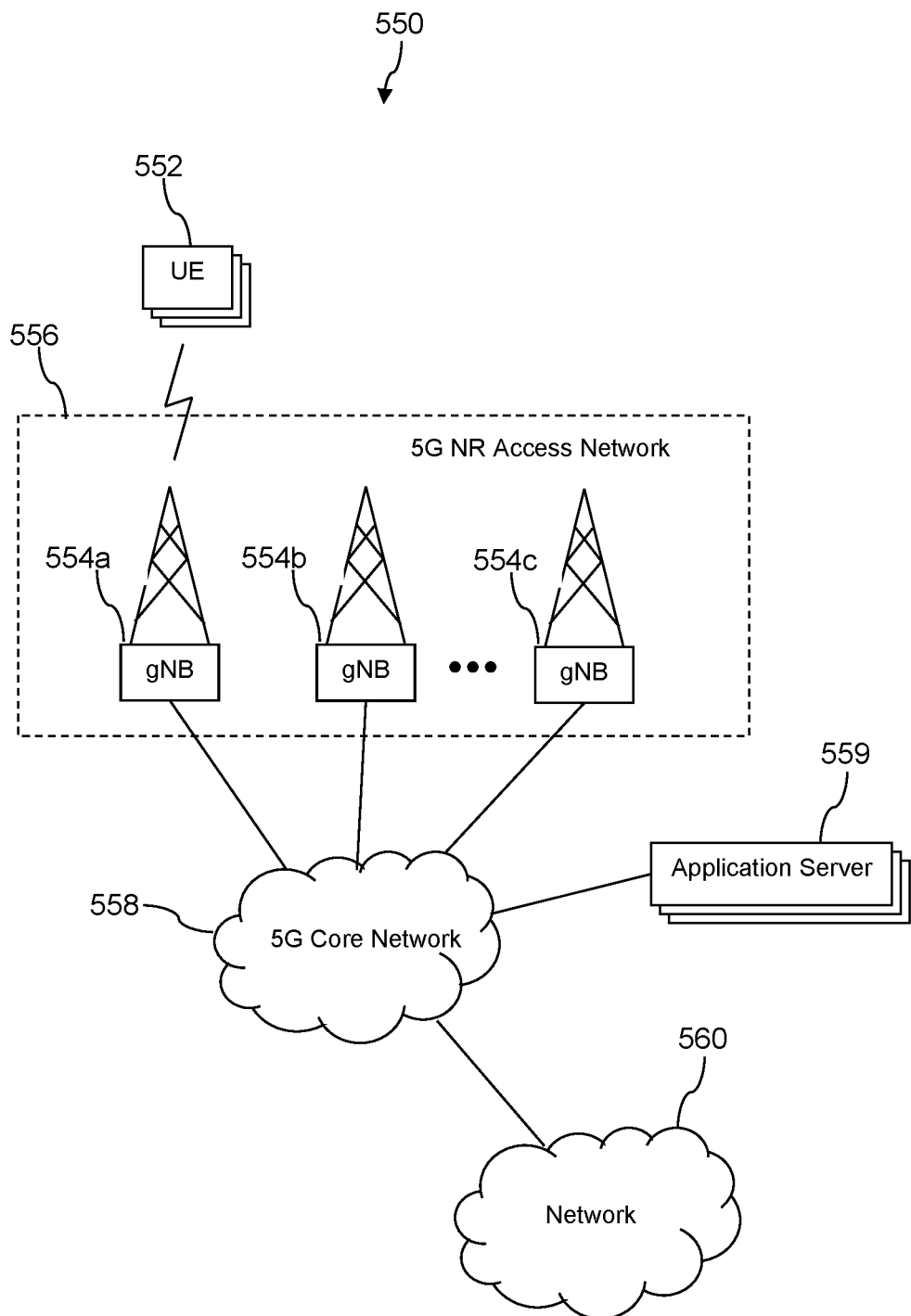
FIG. 9A and FIG. 9B are a block diagram of a 5G communication network according to an embodiment of the disclosure.

Turning now to FIG. 9A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 9B:
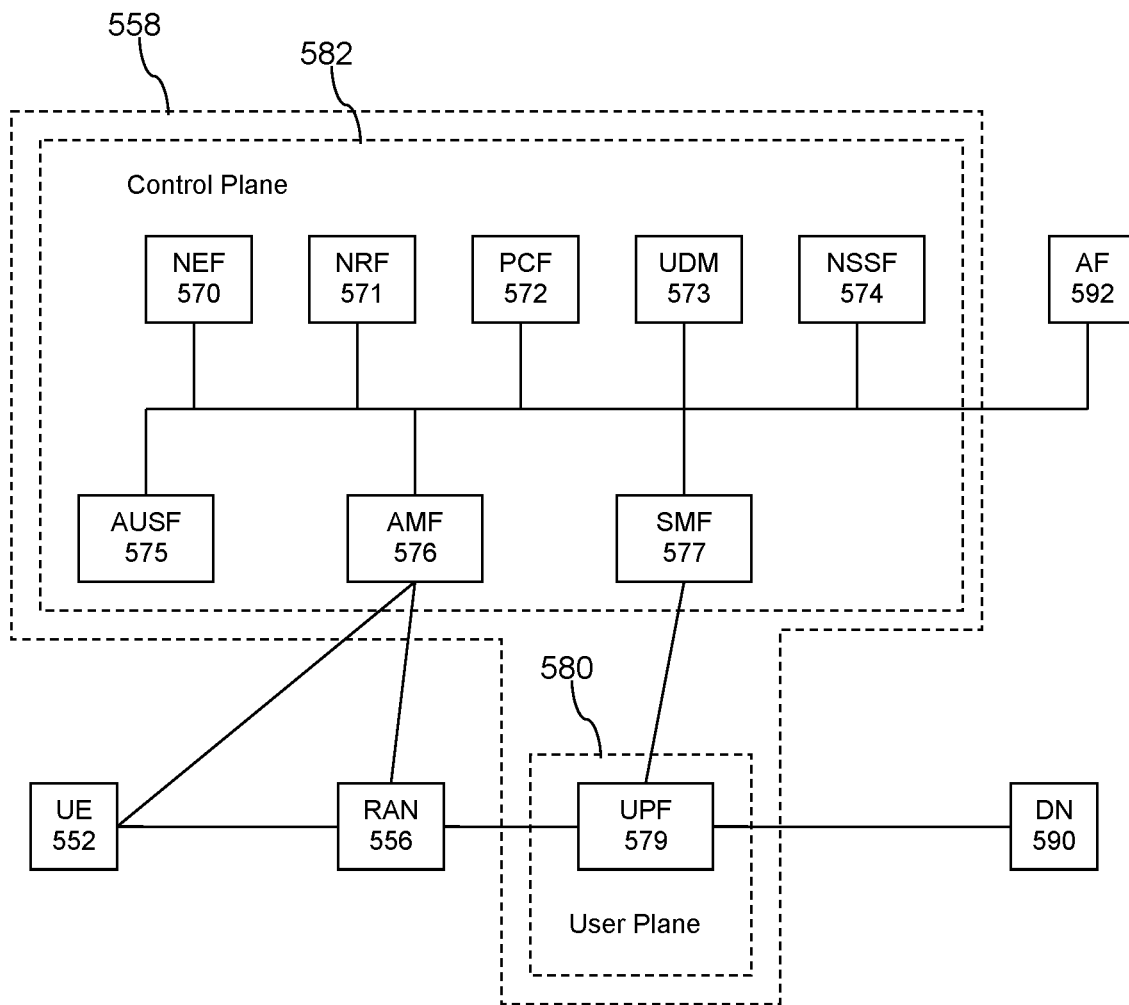

Turning now to FIG. 9B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 9A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 10A:
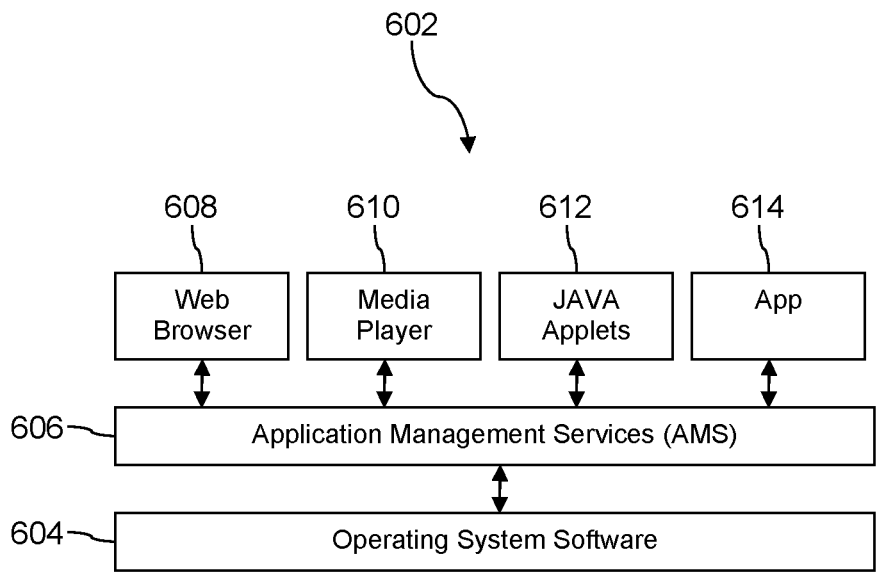
FIG. 10A is a block diagram of a software architecture according to an embodiment of the disclosure.

FIG. 10A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 10A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 10B:
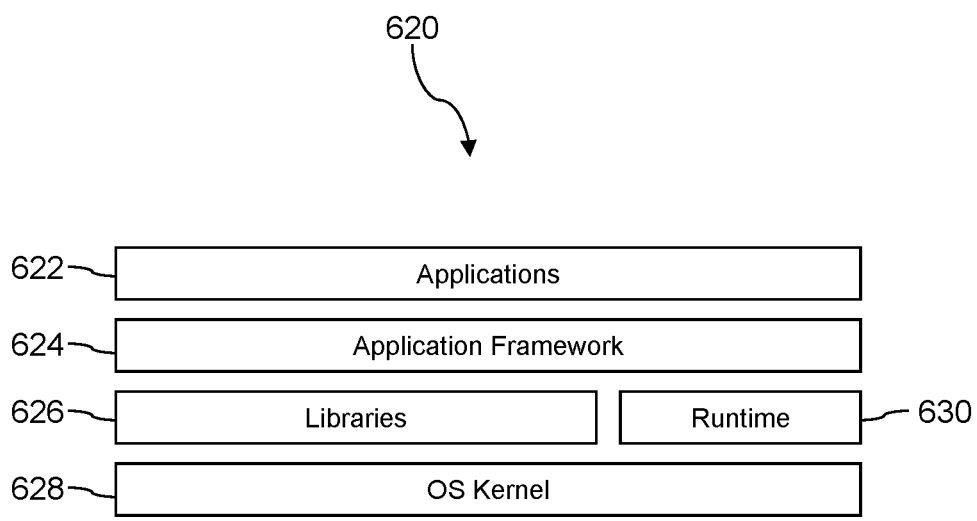
FIG. 10B is a block diagram of another software architecture according to an embodiment of the disclosure.

FIG. 10B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 11:
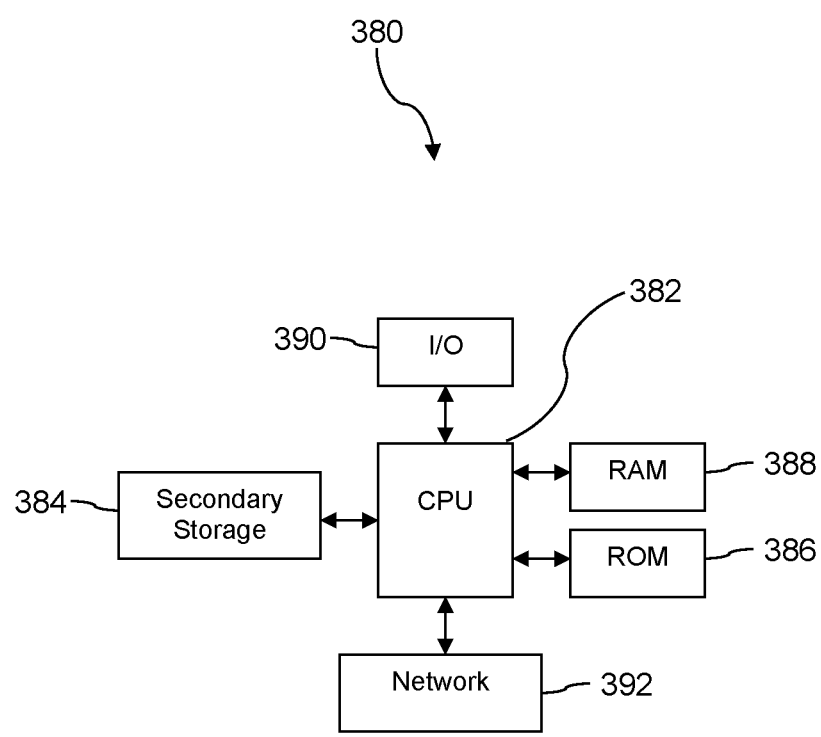
FIG. 11 is a block diagram of a computer system according to an embodiment of the disclosure.

FIG. 11 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of establishing an application layer connection between a user equipment (UE) and an application executing on an edge computing node via a communication network, comprising:

receiving an application service request message from the UE by a computer located in a home network to which the UE is subscribed, wherein the application service request message identifies an application and a current location of the UE;

sending the application service request message by the computer in the home network to a plurality of other networks;

receiving an application service availability message from at least one of the other networks that identifies an edge computing node in that network that executes the identified application, wherein the identity of the edge computing node is an obfuscated identity; and sending an aggregated application service availability message by the computer in the home network to the UE, wherein the aggregated application service availability message comprises the obfuscated identity of the at least one of the other networks, whereby the UE is enabled to request an application layer connection to an edge computing node using an obfuscated identity and whereby the other networks are able to maintain the details of their edge computing topology confidential.

2. The method of claim 1, wherein the obfuscated identify is an encrypted identity of the edge computing node.

3. The method of claim 1, wherein the obfuscated identity is a hashed identity of the edge computing node.

4. The method of claim 1, wherein the obfuscated identity of the edge computing node is changed periodically, whereby the obfuscated identity is prevented from becoming a proxy identity of the edge computing node.

5. The method of claim 1, wherein the UE is a smart phone, a personal digital assistant (PDA), a wearable computer, a headset computer, a laptop computer, a notebook computer, a tablet computer, or an embedded computer.

6. The method of claim 1, wherein the UE is communicatively coupled to the home network at least in part via a cellular wireless communication link.

7. The method of claim 1, wherein the UE is communicatively coupled to the home network at least in part via a WiFi wireless communication link.

8. The method of claim 1, further comprising:

receiving, by the computer in the home network, an application service figure-of-merit from the at least one of the other networks; and sending, by the computer in the home network, the application service figure-of-merit to the UE.

9. The method of claim 8, wherein the application service figure-of-merit is determined by the at least one of the other networks based on at least one of a network latency value, a network jitter value, or a network throughput value associated with a prospective application layer connection between the UE and the edge computing node executing the identified application that is located in the at least one of the other networks.

10. The method of claim 9, wherein the UE selects a first network for connecting to the identified application based on evaluating each application service figure-of-merit associated with each network identified in the aggregated application service availability message, and wherein the UE establishes an application layer connection via the first network to the identified application executing on an edge computing node in the first network.

11. A computer system that enables establishment of an application layer connection between a user equipment (UE) and an application executing on an edge computing node via a communication network, comprising:

a non-transitory memory;

a processor; and an edge broker stored in the non-transitory memory, that when executed by the processor:

receive an application service request message from the UE, wherein the application service request message identifies an application and a current location of the UE, send the application service request message to a plurality of other networks, receive an application service availability message from at least one of the other networks that identifies an edge computing node in that network that executes the identified application, wherein the identity of the edge computing node is an obfuscated identity, and send an aggregated application service availability message to the UE, wherein the aggregated application service availability message comprises the obfuscated identity of the at least one of the other networks, whereby the UE is enabled to request an application layer connection to an edge computing node using an obfuscated identity and whereby the other networks are able to maintain the details of their edge computing topology confidential.

12. The computer system of claim 11, wherein the obfuscated identify is an encrypted identity of the edge computing node.

13. The computer system of claim 11, wherein the obfuscated identity is a hashed identity of the edge computing node.

14. The computer system of claim 11, wherein the obfuscated identity of the edge computing node is changed periodically, whereby the obfuscated identity is prevented from becoming a proxy identity of the edge computing node.

15. The computer system of claim 11, wherein the UE is a smart phone, a personal digital assistant (PDA), a wearable computer, a headset computer, a laptop computer, a notebook computer, a tablet computer, or an embedded computer.

16. The computer system of claim 11, wherein the UE is communicatively coupled to the home network at least in part via a cellular wireless communication link.

17. The computer system of claim 11, wherein the UE is communicatively coupled to the home network at least in part via a WiFi wireless communication link.

18. The computer system of claim 11, wherein the edge broker is further configured to:

receive an application service figure-of-merit from the at least one of the other networks, and send the application service figure-of-merit to the UE.

19. The computer system of claim 18, wherein the application service figure-of-merit is determined by the at least one of the other networks based on at least one of a network latency value, a network jitter value, or a network throughput value associated with a prospective application layer connection between the UE and the edge computing node executing the identified application that is located in the at least one of the other networks.

20. The computer system of claim 19, wherein the UE selects a first network for connecting to the identified application based on evaluating each application service figure-of-merit associated with each network identified in the aggregated application service availability message, and wherein the UE establishes an application layer connection via the first network to the identified application executing on an edge computing node in the first network.

* * * * *